(12) United States Patent
Wang

(10) Patent No.: US 11,954,955 B2
(45) Date of Patent: Apr. 9, 2024

(54) METHOD AND SYSTEM FOR COLLECTING AND MONITORING VEHICLE STATUS INFORMATION

(71) Applicant: HEFEI WEITIANYUNTONG INFORMATION TECHNOLOGY CO., LTD, Anhui (CN)

(72) Inventor: Qing Wang, Anhui (CN)

(73) Assignee: HEFEI WEITIANYUNTONG INFORMATION TECHNOLOGY CO., LTD, Anhui (CN)

( * ) Notice: Subject to any disclaimer, the term of this patent is extended or adjusted under 35 U.S.C. 154(b) by 106 days.

(21) Appl. No.: 17/772,144

(22) PCT Filed: Jun. 30, 2021

(86) PCT No.: PCT/CN2021/103582
§ 371 (c)(1),
(2) Date: Apr. 27, 2022

(87) PCT Pub. No.: WO2022/262013
PCT Pub. Date: Dec. 22, 2022

(65) Prior Publication Data
US 2023/0267779 A1    Aug. 24, 2023

(30) Foreign Application Priority Data
Jun. 15, 2021  (CN) .......................... 202110661775.3

(51) Int. Cl.
*G07C 5/08* (2006.01)
*G06V 20/62* (2022.01)
*G07C 5/12* (2006.01)

(52) U.S. Cl.
CPC ......... *G07C 5/0816* (2013.01); *G06V 20/625* (2022.01); *G07C 5/0808* (2013.01); *G07C 5/12* (2013.01)

(58) Field of Classification Search
CPC ...... G07C 5/0816; G07C 5/0808; G07C 5/12; G06V 20/625
See application file for complete search history.

(56) References Cited

U.S. PATENT DOCUMENTS

| | | | |
|---|---|---|---|
| 10,356,349 B2 * | 7/2019 | Zhou | H01L 27/14625 |
| 2010/0207757 A1 * | 8/2010 | Hernandez | B60K 35/00 |
| | | | 340/461 |
| 2020/0074211 A1 | 3/2020 | Georgis | |

FOREIGN PATENT DOCUMENTS

| | | | | |
|---|---|---|---|---|
| CN | 111415533 A | * | 7/2020 | G06K 9/00785 |
| CN | 111475370 | | 7/2020 | |

(Continued)

OTHER PUBLICATIONS

Espacenet Translation CN111415533A, Jul. 2020, Li et al, 16 pages (Year: 2020).*

(Continued)

*Primary Examiner* — John A Tweel, Jr.
(74) *Attorney, Agent, or Firm* — JCIPRNET

(57) ABSTRACT

The present application discloses a method and system for collecting and monitoring vehicle status information. The method includes the following steps: acquiring vehicle state data and storing it, processing the vehicle state data to obtain optimization data and display it, setting alarm rule, alarm threshold, alarm contact and alarm mode according to the displayed optimization data, and monitoring the optimization data, and generating an alarm when the optimization data reaches the alarm threshold. The vehicle status information collection and monitoring method disclosed in the present application can perform three-dimensional monitoring of resources and display and alarm.

8 Claims, 3 Drawing Sheets

(56) References Cited

FOREIGN PATENT DOCUMENTS

| | | |
|---|---|---|
| CN | 111539686 | 8/2020 |
| CN | 111814751 | 10/2020 |
| CN | 112215222 | 1/2021 |
| CN | 112784834 A * | 5/2021 |

OTHER PUBLICATIONS

Espacenet Translation CN112784834A, May 2021, Yiping et al, 3 pages (Year: 2021).*
"International Search Report (Form PCT/ISA/210) of PCT/CN2021/103582," dated Mar. 9, 2022, pp. 1-5.

* cited by examiner

METHOD AND SYSTEM FOR COLLECTING AND MONITORING VEHICLE STATUS INFORMATION

CROSS-REFERENCE TO RELATED APPLICATION

This application is a 371 of international application of PCT application serial no. PCT/CN2021/103582, filed on Jun. 30, 2021, which claims the priority benefit of China application no. 202110661775.3, filed on Jun. 15, 2021. The entirety of each of the above mentioned patent applications is hereby incorporated by reference herein and made a part of this specification.

TECHNICAL FIELD

The application relates to the field of three-dimensional force tactile sensors, and in particular to a method and system for collecting and monitoring vehicle status information.

BACKGROUND ART

With cloud computing, big data and other technologies becoming more and more mature, there are more and more applications of big data. The need for the vehicle platform to respond to the resource usage of its own resources, the operation status and health of the business, and to abnormal alerts received in a timely manner is more and more urgent. Monitoring, as a platform for three-dimensional monitoring of resources, is particularly important for the aggregation and display of monitoring data and alarms.

In the case of increasing business scale, increasing number of services and frequent changes, a series of problems will be brought about in the face of complex call links, such as effectively process data efficiently to improve the effectiveness of the display.

SUMMARY OF THE APPLICATION

In order to solve the technical problems existing in the background art, the present application proposes a method and system for collecting and monitoring vehicle status information.

The present application proposes a method for collecting and monitoring vehicle status information, including:
- acquiring vehicle state data and storing the vehicle state data;
- processing the vehicle state data to obtain optimization data and display the optimization data;
- setting alarm rule, alarm threshold, alarm contact and alarm mode according to the displayed optimization data; and
- monitoring the optimization data, and generating an alarm when the optimization data reaches the alarm threshold.
- wherein, the processing of the vehicle state data to obtain the optimization data and display the optimization data includes:
- labeling the vehicle state data to obtain thread data;
- extracting relevant features of the thread data;
- constructing training set and test set of the data according to the relevant features;
- constructing a screening model according to the Naive Bayesian classification algorithm, and using the training set and test set to train and test the screening model; and
- when the screening model passes training and testing, the optimized data is obtained according to the screening model and is displayed.

Wherein, labeling the vehicle state data to obtain thread data includes:
- labeling and classifying the vehicle state data according to the vehicle information, data source, data content and transportation business scenarios that generate data in the vehicle status data; the label includes valuable data and invaluable data; among them, the valuable data is lead data;
- the relevant features of the thread data include basic features and associated features; the basic features include basic information of the data, and the associated features include information related to data acquisition methods.

Wherein, the acquiring vehicle state data includes acquiring vehicle information, which includes:
- obtaining vehicle image and extracting license plate image;
- transforming the license plate image into a positive-view license plate image; and
- using license plate recognition network to recognize positive-view license plate image to obtain vehicle information.

Wherein, obtaining the vehicle image and extracting the license plate image includes:
- obtaining the vehicle image, using the YOLOv5 vehicle detection algorithm to detect target for the vehicle in the image, outputting the coordinates of the four corners of the vehicle on the image, and cropping the vehicle image according to the coordinates.

Wherein, using license plate recognition network to recognize positive-view license plate image includes: using the license plate recognition net (LPRnet) wide convolutional neural network to extract features from the positive-view license plate image, to obtain contextual information of local characters; and
- decoding the probability of the local characters, finding multiple most probable sequences through beam search, and returning the first sequence that best matches the predefined template set, which is the license plate recognition result.

The application also proposes a vehicle state information collection and monitoring system, including:
- data acquisition module, used to acquire vehicle state data, normalize and store;
- data processing module, used to process the vehicle state data, obtain optimization data and display the optimization data;
- alarm setting module, used to set alarm rule, alarm threshold, alarm contact and alarm method according to the displayed optimization data; and
- monitoring module, used to monitor the optimization data and generate an alarm when the optimization data reaches the alarm threshold.

Wherein, the data processing module includes:
- screening unit, used to construct a data screening model to screen the vehicle state data;
- labeling unit, used to label the vehicle state data to obtain thread data;
- extraction unit, used to extract relevant feature of the thread data;
- training and testing unit, used to construct the training set and test set of the data according to the relevant feature, and train and test the screening model; and when the screening model passes training and testing, the optimization is obtained according to the screening model and displayed.

wherein, the labeling unit performs labeling processing on the vehicle state data, and obtaining the thread data, including:

labeling and classifying the vehicle state data according to the vehicle information, data source, data content and transportation business scenarios that generate data in the vehicle status data; the label includes valuable data and invaluable data; among them, the valuable data is lead data;

the relevant features of the thread data include basic features and associated features; the basic features include basic information of the data, and the associated features include information related to data acquisition methods.

Wherein, the acquiring vehicle state data includes acquiring vehicle information. The data acquisition module includes:

image acquisition unit, used to obtain the vehicle image, and use the YOLOv5 vehicle detection algorithm to extract the license plate image;

image transformation unit, used to transform the license plate image into a positive-view license plate image; and image recognition unit, used to recognize the positive-view license plate image by using the license plate recognition network.

The image recognition unit recognizes the positive-view license plate image by using the license plate recognition network, including:

using the LPRnet wide convolutional neural network to extract features from the positive-view license plate image, to obtain contextual information of local characters; and decoding the probability of the local characters, finding multiple most probable sequences through beam search, and returning the first sequence that best matches the predefined template set, which is the license plate recognition result.

It can be seen from the above solutions that the method and system for collecting and monitoring vehicle status information provided by the present application have at least the following beneficial effects compared with the prior art:

1. This method can timely and effectively understand the current resource usage status of the vehicle, analyze performance problems, and quickly locate and solve faults when they occur, which has good promotion and application value.

2. Through this method, by introducing the data training method, the validity of the screened data can be improved, which is helpful to improve the processing efficiency of the data, and for the effective combination of data monitoring and artificial intelligence data processing. It provides more possibilities for vehicle status information collection and monitoring.

3. In this method, for complex image information processing, the construction is based on a deep neural network, and the network completes the end-to-end detection, correction and recognition tasks through one forward calculation. The whole process does not require manual feature extraction, and all are automatically learned by the deep neural network, which improves the accuracy of the algorithm and reduces the data processing time.

DETAILED DESCRIPTION OF THE EMBODIMENTS

Figure 1:
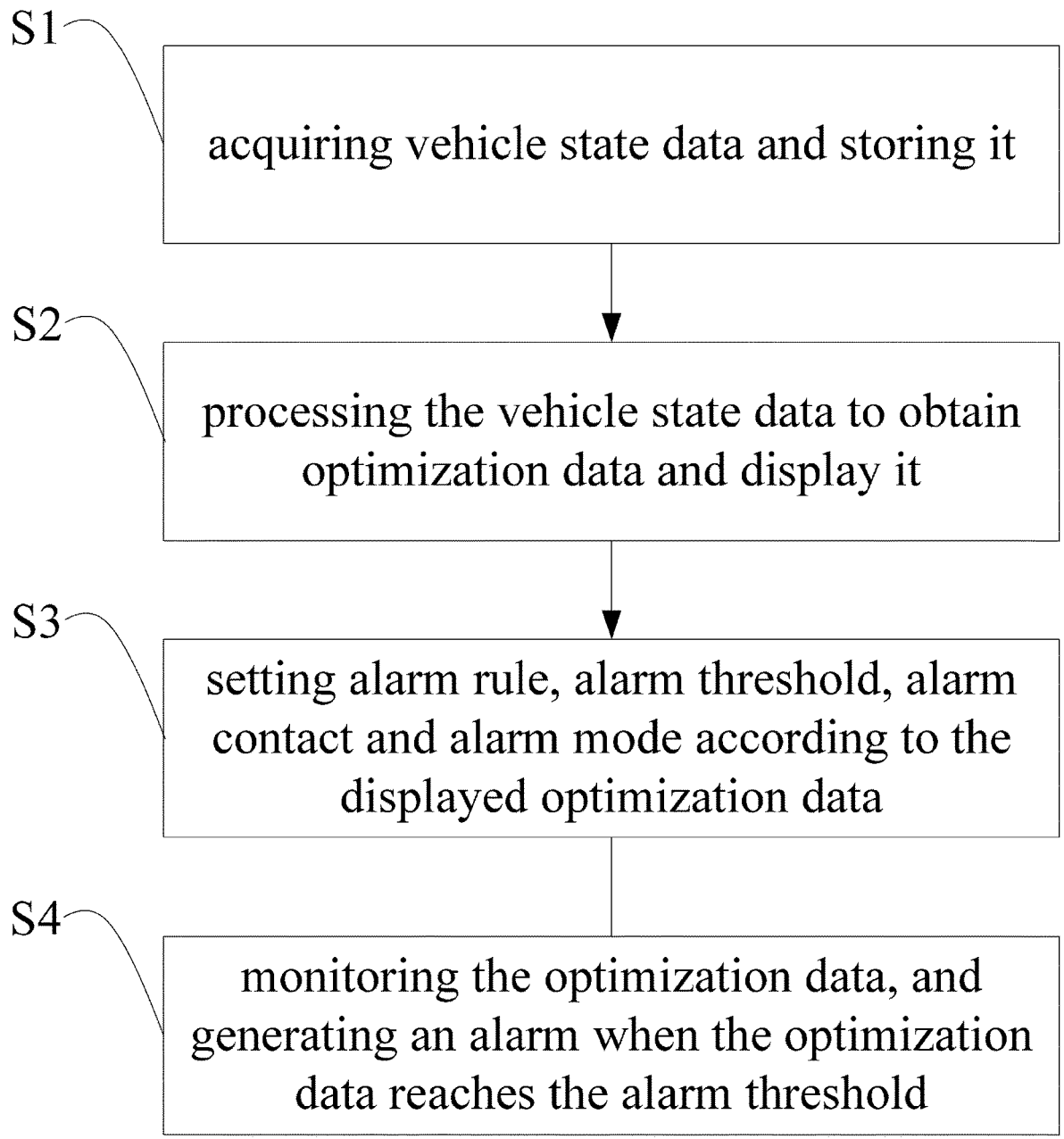
FIG. 1 is a flowchart of a method for collecting and monitoring vehicle status information proposed by the present application.
Figure 2:
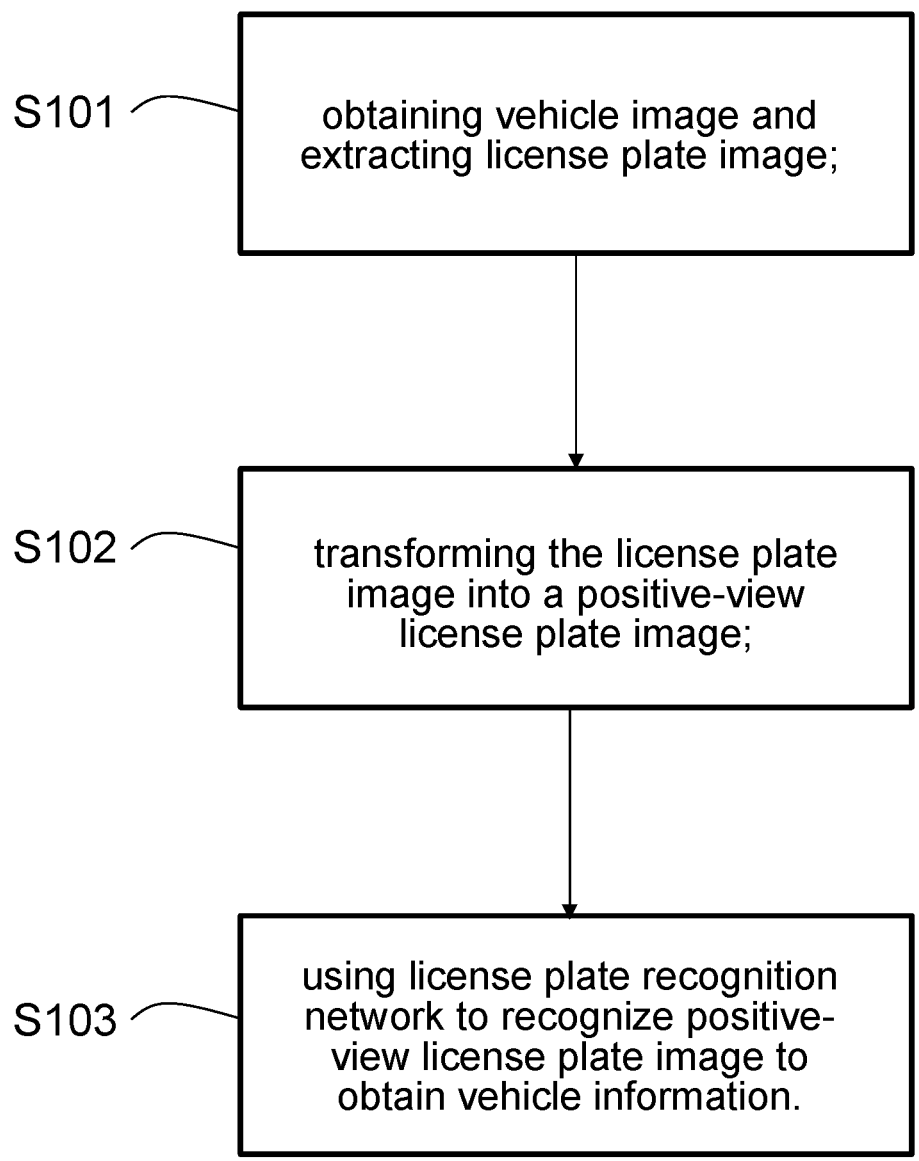
FIG. 2 is a flowchart of step S1 of FIG. 1.
Figure 3:
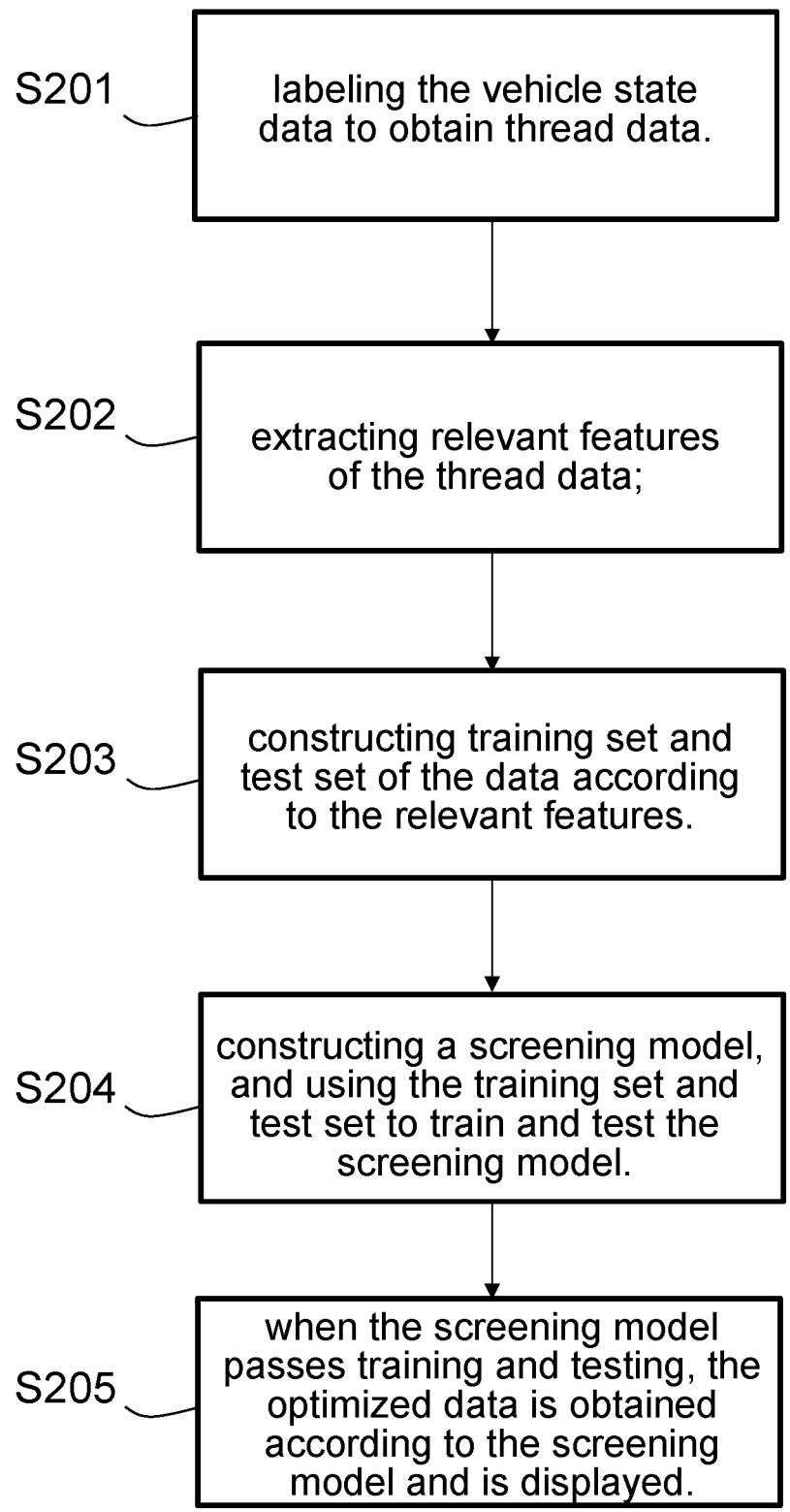
FIG. 3 is a flowchart of step S2 of FIG. 1.

As shown in FIGS. 1-3, FIGS. 1-3 are flowcharts of a method for collecting and monitoring vehicle status information proposed by the present application.

Referring to FIGS. 1-3, the present application proposes a method for collecting and monitoring vehicle status information, including:

S1: acquiring vehicle state data and storing the vehicle state data;

In the embodiment of the present application, the vehicle status data includes data such as vehicle information. Wherein, the vehicle information mainly includes license plate information, and the method for obtaining the license plate information mainly includes:

S101: obtaining vehicle image and extracting license plate image;

S102: transforming the license plate image into a positive-view license plate image; and S103: using license plate recognition network to recognize positive-view license plate image to obtain vehicle information.

It should be noted that, in the embodiment of this application, the license plate image is extracted by using the YOLOv5 vehicle detection algorithm to detect target for the vehicle in the image, outputting the coordinates of the four corners of the vehicle on the image, and cropping the vehicle image according to the coordinates.

In the embodiment of the present application, using license plate recognition network to recognize positive-view license plate image is to use the LPRnet wide convolutional neural network to extract features from the positive-view license plate image, to obtain contextual information of local characters, and decoding the probability of the local characters, finding multiple most probable sequences through beam search, and returning the first sequence that best matches the predefined template set, which is the license plate recognition result.

S2: processing the vehicle state data to obtain optimization data and display the optimization data;

In the embodiment of the present application, Step S2 includes:

S201: labeling the vehicle state data to obtain thread data.

In the embodiment of the present application, labeling the vehicle state data to obtain thread data includes: labeling and classifying the vehicle state data according to the vehicle information, data source, data content and transportation business scenarios that generate data in the vehicle status data; the label includes valuable data and invaluable data.

S202: extracting relevant features of the thread data;

In the embodiment of the present application, the relevant features of the thread data include basic features and associated features; the basic features include basic information of the data, and the associated features include information related to data acquisition.

S203: constructing training set and test set of the data according to the relevant features.

S204: constructing a screening model, and using the training set and test set to train and test the screening model.

S205: when the screening model passes training and testing, the optimized data is obtained according to the screening model and is displayed.

In the embodiment of the present application, the training set and the test set are constructed according to the hold-out method, the cross-validation method or the self-help method. The screening model is constructed according to the Naive Bayesian classification algorithm. When the screening model passes training and testing, the optimized data is obtained according to the screening model and is displayed.

S3: Setting alarm rule, alarm threshold, alarm contact and alarm mode according to the displayed optimization data.

S4: monitoring the optimization data, and generating an alarm when the optimization data reaches the alarm threshold.

In this embodiment, the method at least has the following beneficial effects compared with the prior art:

1. This method can timely and effectively understand the current resource usage status of the vehicle system, analyze performance problems, and quickly locate and solve faults when they occur, which has good promotion and application value.

2. Through this method, by introducing the data training method, the validity of the screened data can be improved, which is helpful to improve the processing efficiency of the data, and for the effective combination of data monitoring and artificial intelligence data processing. It provides more possibilities for vehicle status information collection and monitoring.

3. In this method, for complex image information processing, the construction is based on a deep neural network, and the network completes the end-to-end detection, correction and recognition tasks through one forward calculation. The whole process does not require manual feature extraction, and all are automatically learned by the deep neural network, which improves the accuracy of the algorithm and reduces the data processing time.

The embodiment of the present application also proposes a vehicle state information collection and monitoring system, including:
- data acquisition module, used to acquire vehicle state data, normalize and store;
- data processing module, used to process the vehicle state data, obtain optimization data and display the optimization data;
- alarm setting module, used to set alarm rule, alarm threshold, alarm contact and alarm method according to the displayed optimization data; and
- monitoring module, used to monitor the optimization data and generate an alarm when the optimization data reaches the alarm threshold.

In the embodiments of the present application, preferably, the data processing module includes:
- screening unit, used to construct a data screening model to screen the vehicle state data.
- labeling unit, used to label the vehicle state data to obtain thread data.
- extraction unit, used to extract relevant feature of the thread data; in the embodiments of the present application, the relevant features of the thread data include basic features and associated features; the basic features include basic information of the data, and the associated features include information related to data acquisition methods.
- training and testing unit, used to construct the training set and test set of the data according to the relevant feature, and train and test the screening model.
- when the screening model passes training and testing, the optimization is obtained according to the screening model and displayed.

In the embodiment of the present application, the training set and the test set are constructed according to the hold-out method, the cross-validation method or the self-help method. The screening model is constructed according to the Naive Bayesian classification algorithm.

When the screening model passes training and testing, the optimized data is obtained according to the screening model and is displayed.

In the embodiments of the present application, the data acquisition module, which includes a module for extracting vehicle information, include:
- image acquisition unit, used to obtain the vehicle image, and extract the license plate image;
- image transformation unit, used to transform the license plate image into a positive-view license plate image; and
- image recognition unit, used to recognize the positive-view license plate image by using the license plate recognition network.

It should be noted that, in the embodiment of this application, the license plate image is extracted by using the YOLOv5 vehicle detection algorithm to detect target for the vehicle in the image, outputting the coordinates of the four corners of the vehicle on the image, and cropping the vehicle image according to the coordinates.

In the embodiment of the present application, using license plate recognition network to recognize positive-view license plate image is to use the LPRnet wide convolutional neural network to extract features from the positive-view license plate image, to obtain contextual information of local characters, and decoding the probability of the local characters, finding multiple most probable sequences through beam search, and returning the first sequence that best matches the predefined template set, which is the license plate recognition result.

The above is only the preferred embodiment of the present application, but the scope of protection of the present application is not limited thereto, and any equivalents or modifications of the technical solutions of the present application and the application concept thereof should be comprised in the scope of the present application within the scope of the technical scope of the present application.

What is claimed is:

1. A method for collecting and monitoring vehicle status information, comprising:
   acquiring vehicle state data and storing the vehicle state data;
   processing the vehicle state data to obtain optimization data and display the optimization data;
   setting alarm rule, alarm threshold, alarm contact and alarm mode according to the displayed optimization data; and
   monitoring the optimization data, and generating an alarm when the optimization data reaches the alarm threshold,
   wherein, the processing of the vehicle state data to obtain the optimization data and display the vehicle state data comprises:
   labeling the vehicle state data to obtain thread data;
   extracting relevant features of the thread data;
   constructing training set and test set of the data according to the relevant features;
   constructing a screening model according to the Naive Bayesian classification algorithm, and using the training set and test set to train and test the screening model; and when the screening model passes training and testing, the optimized data is obtained according to the screening model and is displayed.

2. The method according to claim 1, wherein, labeling the vehicle state data to obtain thread data comprises:
labeling and classifying the vehicle state data according to the vehicle information, data source, data content and transportation business scenarios that generate data in the vehicle status data; the label comprises valuable data and invaluable data; among them, the valuable data is lead data;
the relevant features of the thread data comprise basic features and associated features; the basic features comprise basic information of the data, and the associated features comprise information related to data acquisition methods.

3. The method according to claim 1, wherein, the acquiring vehicle state data comprise acquiring vehicle information, comprises:
obtaining vehicle image and extracting license plate image;
transforming the license plate image into a positive-view license plate image; and
using license plate recognition network to recognize positive-view license plate image to obtain vehicle information.

4. The method according to claim 3, wherein, obtaining the vehicle image and extracting the license plate image comprises:
obtaining the vehicle image, using the YOLOv5 vehicle detection algorithm to detect target for the vehicle in the image, outputting the coordinates of the four corners of the vehicle on the image, and cropping the vehicle image according to the coordinates.

5. The method according to claim 3, wherein, using license plate recognition network to recognize positive-view license plate image comprises:
using the license plate recognition (LPRnet) wide convolutional neural network to extract features from the positive-view license plate image, to obtain contextual information of local characters; and
decoding the probability of the local characters, finding multiple most probable sequences through beam search, and returning the first sequence that best matches a predefined template set, which is the license plate recognition result.

6. A vehicle state information collection and monitoring system, comprising:
data acquisition module, used to acquire vehicle state data, normalize and store;
data processing module, used to process the vehicle state data, obtain optimization data and display the optimization data;
alarm setting module, used to set alarm rule, alarm threshold, alarm contact and alarm method according to the displayed optimization data; and
monitoring module, used to monitor the optimization data and generate an alarm when the optimization data reaches the alarm threshold,
wherein, the data processing module comprises:
screening unit, used to construct a data screening model to screen the vehicle state data;
labeling unit, used to label the vehicle state data to obtain thread data;
extraction unit, used to extract relevant feature of the thread data;
training and testing unit, used to construct the training set and test set of the data according to the relevant feature, and train and test the screening model; and
when the screening model passes training and testing, the optimization is obtained according to the screening model and displayed.

7. The system according to claim 6, wherein, the labeling unit performs labeling processing on the vehicle state data, and obtaining the thread data, comprises:
labeling and classifying the vehicle state data according to the vehicle information, data source, data content and transportation business scenarios that generate data in the vehicle status data; the label comprises valuable data and invaluable data; among them, the valuable data is lead data;
the relevant features of the thread data comprise basic features and associated features; the basic features comprise basic information of the data, and the associated features comprise information related to data acquisition methods.

8. The system according to claim 6, wherein, the acquiring vehicle state data comprises acquiring vehicle information, the data acquisition module comprises:
image acquisition unit, used to obtain the vehicle image, and use the YOLOv5 vehicle detection algorithm to extract the license plate image;
image transformation unit, used to transform the license plate image into a positive-view license plate image; and
image recognition unit, used to recognize the positive-view license plate image by using the license plate recognition network,
wherein the image recognition unit recognizes the positive-view license plate image by using the license plate recognition network, comprises:
using the license plate recognition (LPRnet) wide convolutional neural network to extract features from the positive-view license plate image, to obtain contextual information of local characters; and
decoding the probability of the local characters, finding multiple most probable sequences through beam search, and returning the first sequence that best matches a predefined template set, which is the license plate recognition result.

* * * * *